United States Patent [19]

Boutni

[11] Patent Number: 4,628,074
[45] Date of Patent: Dec. 9, 1986

[54] POLYCARBONATE COMPOSITIONS

[75] Inventor: Omar M. Boutni, Mt. Vernon, Ind.

[73] Assignee: General Electric Company, Mt. Vernon, Ind.

[21] Appl. No.: 797,999

[22] Filed: Nov. 14, 1985

[51] Int. Cl.$^4$ .............................................. C08L 69/00
[52] U.S. Cl. ................................... 525/146; 524/236; 524/371; 524/508; 525/133; 525/147
[58] Field of Search ............... 525/133, 146, 439, 147; 524/508, 371

[56] References Cited

U.S. PATENT DOCUMENTS 4,559,388 12/1985 Liu et al. .............................. 525/146

Primary Examiner—Theodore E. Pertilla
Attorney, Agent, or Firm—Myron B. Kapustij; Martin B. Barancik

[57] ABSTRACT

Resinous composition exhibiting improved impact strength consisting essentially of, in physical admixture:
(i) a blend containing
 (a) at least one aromatic carbonate polymer, and
 (b) at least one amorphous copolyester resin; and
(ii) an amount at least effective to improve the impact strength of said blend of at least one olefin diene terpolymer.

19 Claims, No Drawings

POLYCARBONATE COMPOSITIONS

BACKGROUND OF THE INVENTION

Polycarbonate compositions containing blends of a carbonate polymer and an amorphous polyester derived from a difunctional aromatic carboxylic acid such as isophthalic acid, terephthalic acid, or mixtures thereof and a diol component which contains cyclohexanedimethanol are known in the art. These compositions exhibit good optical clarity, processability, and impact properties. However, in certain applications there exists a need for compositions of this type which possess better impact properties than exhibited by these compositons. It is, therefore, an object of the instant invention to provide compositions containing a blend of a polycarbonate resin and an amorphous polyester resin which exhibit better impact properties that those possessed by the presently available compositions of this type.

SUMMARY OF THE INVENTION

The instant invention is directed to blends of polycarbonate resin and an amorphous polyester resin derived from at least one aromatic dicarboxylic acid selected from isophthlaic acid, terephthalic acid, or mixtures thereof and a diol component which contains cyclohexanedimethanol which exhibit improved processability. More particularly the instant invention is directed to these blends which contain an amount at least effective to improve the impact properties thereof of an olefin diene terpolymer.

DESCRIPTION OF THE INVENTION

It has been discovered that the addition of at least one olefin diene terpolymer to a blend containing at least one polycarbonate resin and at least one amorphous polyester resin is effective in positively upgrading the impact properties of these blends.

The instant invention is thus directed to a polycarbonate/amorphous polyester resin composition exhibiting improved impact properties comprised of:
(i) a blend consisting essentially of
  (a) at least one aromatic polycarbonate resin, and
  (b) at least one amorphous polyester resin containing the reaction products of at least one polyol component selected from 1,4-cyclohexanediemthanol or a mixture of 1,4-cyclohexanedimethanol and ethylene glycol, and at least one aromatic dicarboxylic acid component selected from isophthlaic acid, terephtalic acid, or mixtures thereof, or the ester forming reactive derivatives thereof; and
(ii) an amount at least effective to improve the impact properties of said blend of at least one olefin diene terpolymer.

The polycarbonate resins utilized in the instant invention are well known in the art and are generally commercially available materials. These polycarbonates, as well as methods for their preparation, are described, inter alia, in U.S. Pat. Nos. 3,161,615, 3,220,973, 3,312,660, 3,312,659, 3,313,777, 3,666,614 and 3,939,672, all of which are incorporated herein by reference. These polycarbonates may be prepared by a variety of conventional and well known processes which include, inter alia, interfacial polymerization, pyridine process, transesterification, and melt polymerization. A convenient process for the preparation of these polycarbonates is the interfacial polymerization process involving the coreaction of at least one dihydric phenol with a carbonate precursor. Typically, the dihydric phenols used may be represented by the general formula

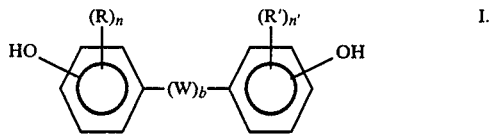

wherein:
R is independently selected from monovalent hydrocarbon radicals, monovalent hydrocarbonoxy radicals, and halogen radicals;
R' is independently selected from monovalent hydrocarbon, monovalent hydrocarbonoxy, and halogen radicals;
W is selected from divalent hydrocarbon radicals, —S—, —S—S—, —O—,

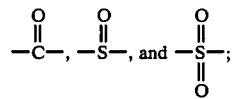

b is either zero or one; and
n and n' are independently selected from integers having a value of from 0 to 4 inclusive.

The monovalent hydrocarbon radicals represented by R and R' include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals may be represented by the general formula —OR$^1$ wherein R$^1$ is a monovalent hydrocarbon radical of the type described hereinafore. Preferred monovalent hydrocarbonoxy radicals are the alkoxy and aryloxy radicals.

The divalent hydrocarbon radicals represented by W include the alkylene radicals, the alkylidene radicals, the cycloalkylene radicals, and the cycloalkylidene radicals. The preferred cycloalkylene and cycloalkylidene radicals are those containing from 6 to about 16 ring carbon atoms. The preferred alkylene radicals are those containing from 2 to about 30 carbon atoms. The preferred alkylidene radicals are those containing from 1 to about 30 carbon atoms.

Some illustrative non-limiting examples of dihydric phenols of Formula I include:
2,2-bis(4-hydroxyphenyl)propane (bisphenol-A);
bis(4-hydroxyphenyl)methane;
2,2-bis(3,5-dibromo-4-hydroxyphenyl)propane;
2,2-bis(3,5-dimethyl-4-hydroxyphenyl)propane;
1,1-bis(4-hydroxyphenyl)decane;
1,1-bis(4-hydroxyphenyl)cyclododecane;
1,5-bis(4-hydroxyphenyl)pentane;
4,4'-thiodiphenol;
1,1-bis(4-hydroxyphenyl)cyclohexane;
bis(4-hydroxyphenyl)ether; and
4,4'-dihydroxydiphenyl.

Other dihydric phenols are also available and are disclosed, inter alia, in U.S. Pat. Nos. 2,999,835, 3,028,365, and 3,334,154, all of which are incorporated herein by reference.

It is, of course, possible to employ a mixture of two or more different dihydric phenols as well as individual dihydric phenols in the preparation of the instant carbonate polymers.

The carbonate precursor employed may be a carbonyl halide, a carbonate ester, or a bis-haloformate. The carbonyl halides are carbonyl bromide, carbonyl chloride, and mixtures thereof. Typical of the carbonate esters are diphenyl carbonate; di(halophenyl)carbonates such as di(chlorophenyl)carbonate, di(bromophenyl)carbonate, and di(trichlorophenyl)carbonate; di(alkylphenyl)carbonates such as di(tolyl)carbonate; di(naphthyl)carbonate; di(halonaphthyl)carbonates; phenyl tolyl carbonate; chlorophenyl chloronaphthyl carbonate; and mixtures thereof.

The bishaloformates include the bis-haloformates of dihydric phenols such as bisphenol-A and hydroquinone; bishalformates of glycols such as ethylene glycol, neopentyl gylocl, and polyethylene glycol; and the like. While other carbonate precursors will occur to those skilled in the art carbonyl chloride, also known as phosgene, is the preferred carbonate precursor.

The polycarbonates of the instant invention contain at least the following recurring structural unit:

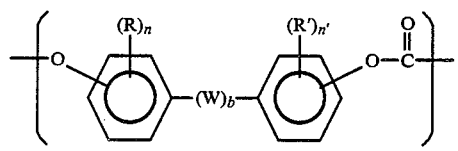

II.

wherein R, R', W, b, n and n' are as defined hereinafore. These polycarbonates generally have an intrinsic viscosity, as measured in methylene chloride at 25° C., of at least about 0.38 dl/gm, preferably from about 0.4 to about 1.0 dl/gm.

In addition to the polycarbonates described hereinafore derived from a dihydric phenol and a carbonate precursor the instant invention also includes the thermoplastic randomly branched polycarbonates. These branched polycarbonates may be obtained by the reaction of said dihydric phenol, carbonate precursor, and a minor amount of a branching agent. The branching agent is generally a polyfunctional aromatic compound containing at least three functional groups which may be hydroxyl, carboxyl, carboxylic anhydride, haloformyl, and mixtures thereof. These polyfunctional aromatic compounds are well known in the art and are described, inter alia, in U.S. Pat. Nos. 3,525,712, 3,541,049, 3,544,514, 3,635,895, 3,816,373, 4,001,184 and 4,204,047, all of which are incorporated herein by reference. Some illustrative non-limiting examples of these polyfunctional compounds include trimellitic anhydride, trimellitic acid, trimellityl trichloride, 4-chloroformyl phthalic anhydride, pyromellitic anhydride, and trimesic acid. The amount of these compounds utilized is in the range of from about 0.05 to about 2 mole percent based on the amount of dihydric phenol utilized.

The amorphous polyester resin or copolyester copolymer which forms the second component of the instant polycarbonate/amorphous polyester blends is a polyester which can, without limitation, comprise the reaction products of: (a) a glycol portion comprising a 1,4-cyclohexanedimethanol with an acid portion comprising terephthalic acid, isophthalic acid, or mixtures thereof; or (b) a glycol portion comprising a 1,4-cyclohexanedimethanol and ethylene glycol wherein the molar ratio of the 1,4-cyclohexanedimethanol to ethylene glycol in the glycol portion is from about 4:1 to 1:4, with an acid portion comprising terephthalic acid, isopthalic acid, or mixtures thereof.

This copolyester may be prepared by procedures well known in the art, such as by the condensation reactions substantially as shown and described in U.S. Pat. No. 2,901,466 which is hereby incorporated herein by reference. More particularly, the acid or mixture of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed unitl the desired degree of polymerization is achieved. The product can be considered finished at this stage or it can be subjected to further polymerization in the solid phase in accordance with well known techniques. Thus, the highly monomeric condensation product can be cooled, pulverized, and the powder heated to a temperature somewhat less than employed during the last stage of molten polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing inert atmosphere at either normal atmospheric pressure or under gerately reduced pressure.

The copolyesters will generally have an intrinsic viscosity of at least about 0.4 dl/gm as measured in 60/40 phenol/tetrachloroethane or other similar solvent at about 25° C. and will have a heat distortion temperature from about 60° C. to about 70° C. The relative amounts of the 1,4-cyclohexanedimethanol to ethylene glycol in the glycol portion of the copolyester (b) may vary so long as the molar ratio of 1,4-cyclohexanedimethanol to ethylene glycol is from 1:4 to 4:1, in order to provide a polyester copolymer having a suitable heat distortion temperature within the recited range, and other suitable properties.

One quite useful type of polyester for use as the amorphous polyester component (ii) is a copolyester as described hereinafore wherein the glycol portion has a predominance of ethylene glycol over 1,4-cyclohexanedimethanol, for example greater than 50/50 and especially preferably is about 70 molar ethylene glycol to 30 molar 1,4-cyclohexanedimethanol, and the acid portion is terephthalic acid. A preferred polyester of this type is commercially available under the tradename KODAR PETG 6763 from Eastman Chemical Co. A preferred polyester is one derived from 1,4-cyclohexanedimethanol as the glycol portion and a mixture of isophthalic and terephthalic acids as the acid portion. This type of polyester is available from Eastman Chemical Co. under the tradename KODAR A150.

It is to be understood that in the preparation of the instant amorphous copolyesters the acid portion may be either the acids as set forth hereinafore, or their ester forming reactive derivatives, such as for example, the acid dihalides. Thus, for example, instead of utilizing isophthalic acid, terephthalic acid, or mixtures thereof it is possible to use isophthaloyl dihalide, terephthaloyl dihalide, and mixtures thereof.

While the ratio of the polycarbonate component to the polyester component in the instant blends may vary widely, e.g., from about 1 to about 99 weight percent polycarbonate and from about 99 to about 1 weight percent of the copolyester, preferred blends are those that contain from about 20 to about 80 weight percent polycarbonate and from about 80 to about 20 weight percent copolyester, more preferably from about 30 to about 70 weight percent polycarbonate and from about 70 to about 30 weight percent copolyester, and most preferably from about 40 to about 60 weight percent polycarbonate and from about 60 to about 40 weight percent copolyester.

The olefin diene terpolymers used to improve the impact properties of the polycarbonate/polyester blends are well known in the art and are generally commercially available or may be readily prepared by known conventional methods. They may be prepared by the reaction of at least one olefin with a diene. The olefins used in the preparation of these terpolymers are well known olefins and include the lower olefins such as ethylene propylene, butylene and the like. The preferred olefins are those containing from 2 to about 4 carbon atoms. The dienes include the well known dienes such as butadiene, pentadiene, isoprene, cyclohexadiene, cyclopentadiene, and the norbornenes such as ethylidene norbornene. Preferred dienes are the linear dienes containing from 4 to about 10 carbon atoms and the cyclic dienes containing from 5 to about 10 ring carbon atoms. Particularly preferred dienes are the norbornenes.

Preferred olefin diene terpolymers are those belonging to the EPDM family, i.e., those derived from ethylene, propylene and a diene such as norbornene or ethylidene norbornene.

The amounts of the olefin diene terpolymer present in the instant compositions are amounts which are effective to positively upgrade the impact properties, e.g., impact strength, of the polycarbonate/polyester blends. Greater than these amounts may be used so long as the properties desired for a particular purpose of these compositions are substantially maintained. That is to say, the amounts of the olefin diene terpolymer present in the instant compositions are amounts which are at least effective to improve the imact properties of the polycarbonate/copolyester blends but insufficient to substantially deleteriously affect substantially most of the advantageous properties of said blends.

Generally a minimum of about 1 weight percent of said olefin diene terpolymer is sufficient to observe an improvement in the impact properties of the blends. A minimum of about 2 weight percent of the olefin diene terpolymer is preferred, while a minimum of about 3 weight percent is more preferred. A level of about 25 weight percent of said olefin diene terpolymer, preferably a level of about 20 weight percent, and more preferably a level of about 15 weight percent should generally not be exceeded. Weight percent of said olefin diene terpolymer is measured as the amount of said olefin diene terpolymer in the total of said olefin diene terpolymer and said polycarbonate/copolyester blend.

The instant compositions thus generally contain from about 1 to about 25 weight percent of said olefin diene terpolymer, preferably from about 2 to about 20 weight percent, and more preferably from about 3 to about 15 weight percent.

The compositions of the instant invention may optionally contain the commonly known and used additives such as, for example, antistatic agents; antioxidants; inert fillers; ultraviolet radiation stabilizers such as the benzophenones, benzotriazoles, and cyanoacrylates; hydrolytic stabilizers such as the epoxides disclosed in U.S. Pat. Nos. 3,489,716, 3,138,379 and 3,839,247, all of which are incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali and alkaline earth metal salts of sulfonic acids. These types of flame retardants are disclosed, inter alai, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. These additives are present in the instant compositions in amounts which are effective to render said composition, flame retardant, i.e., a flame retardant amount. Additionally, halogenated, particularly brominated compounds such as tetrabromobisphenol-A carbonate, decabromo diphenyl oxide, tetrachlorodiphthalimide and the like can also be employed alone or together with the salts in flame retardant amounts. In general these amounts range from about 0.1 to about 10 weight percent, based on the total amounts of said flame retardant additives and polycarbonate/polyester blends and olefin diene terpolymers present.

DESCRIPTION OF THE PREFERRED EMBODIMENTS

In order that those skilled in the art may better understand how the instant invention may be practiced the following examples are presented by way of illustration and not by way of limitation. In the examples all parts and percentages are on a weight basis unless otherwise specified.

The following example illustrates a composition falling outside the scope of the instant invention. This example is presented for comparative purposes only.

EXAMPLE 1

This example illustrates a blend of a polycarbonate resin and a copolyester resin. This example contains no olefin diene terpolymer.

A composition containing 50 weight % of a polycarbonate resin derived from bisphenol-A and phosgene (General Electric Company's LEXAN® 105 resin) and 50 weight % of an amorphous copolyester resin (Eastman Chemical Co.'s KODAR® A150) was prepared by blending the ingredients together in a laboratory blender. The resulting mixture was fed to an extruder, the extrudate was comminuted into pellets, and the pellets were injection molded into test specimens measuring 63.5 mm×12.7 mm×3.2 mm thick and 63.5 mm×12.7 mm×6.4 mm thick.

The specimens were were subjected to the Notched Izod impact test in accordance with ASTM D256 test method and the results are set forth in Table I.

The following examples illustrate the compositions of the instant invention.

EXAMPLE 2

To one hundred parts by weight of the 50/50 polycarbonate/amorphous copolyester blend of Example 1 there are added 2 parts per hundred parts by weight blend of an EPDM terploymer (Exxon's EPDM V3708). The ingredients were blended together in a laboratory blender. The resulting mixture was fed to an extruder, the extrudate was comminuted into pellets, and the pellets were injection molded into tests specimens as described in Example 1. These test specimens were subjected to the Notched Izod test and the results are set forth in Table I.

EXAMPLE 3

The procedure of Example 2 is substantially repeated except that 4 parts per hundred parts of blend of the EPDM terpolymer of Example 2 are used. Test specimens were prepared substantially in accordance with the procedure of Example 2. The specimens were subjected to the Notched Izod test and the results are set forth in Table I.

TABLE 1

| Example No. | Notched Izod (kg cm./cm.) | |
|---|---|---|
| | 3.2 mm | 6.4 mm |
| 1 | 8.2–87* | — |
| 2 | 87$^{100}$** | 31.2 |
| 3 | 84.3$^{100}$ | 28.3 |

*Notched Izod of the control of Example 1 varies between 8.2–87 due to the fact that the notched radius is right at the brittle/ductile transition point.
**The superscripts indicate the percent ductility of the failure mode. The absence of a superscript indicates a brittle failure.

As illustrated by the data in Table I the compositions of the instant invention (Examples 2-3) exhibit improved impact strengths as compared with the unmodified polycarbonate/amorphous copolyester blend of Example 1. At the thin section the test specimens of the instant invention exhibit 100% ductility while the prior art test specimens of Example 1 are brittle.

The instant compositions are free of glass fillers such as glass fibers; olefin polymers or copolymers other than those described hereinafore such as, for example, olefin acrylate or methacrylate copolymers and linear low density polyethylene; and selectively hydrogenated linear, sequential, or radial teleblock copolymers of a vinyl aromatic compound and an olefinic elastomer such as those described in U.S. Pat. No. 4,481,331.

The compositions of the instant invention are useful in the preparation of shaped articles, molded articles, and the like.

Obviously other modifications and variations of the present invention are possible in light of the above teachings. It is, therefore, to be understood that changes may be made in the particular embodiments of the invention as described which are within the full intended scope of the invention as defined by the appended claims.

What is claimed is:

1. Resinous polycarbonate composition exhibiting improved impact strength consisting essentially of, in physical admixture:
(i) a blend consisting essentially of
   (a) at least one aromatic polycarbonate resin, and
   (b) at least one copolyester resin containing the reaction products of (A) at least one polyol selected from 1,4-cyclohexanedimethanol or a mixture of 1,4-cyclohexanedimathanol and ethylene glycol, and (B) at least one aromatic dicarboxylic acid or its ester forming reactive derivative selected from isophthalic acid, terephthalic acid, or mixtures thereof; and
(ii) an amount at least effective to improve the impact strength of said blend of at least one olefin diene terpolymer.

2. The composition of claim 1 wherein said amount of said olefin diene terpolymer is from about 1 to about 25 weight percent, based on the total amounts of (i) and (ii) present.

3. The composition of claim 2 wherein said amount is from about 2 to about 20 weight percent.

4. The composition of claim 3 wherein said amount is from about 3 to about 15 weight percent.

5. The composition of claim 1 wherein said olefin diene terpolymer is an ethylene propylene diene terpolymer.

6. The composition of claim 5 wherein said diene is a norbornene.

7. The composition of claim 6 wherein said norbornene is norbornene.

8. The composition of claim 6 wherein said norbornene is ethylidene norbornene.

9. The composition of claim 1 wherein said polyol is selected from a mixture of 1,4-cyclohexanedimethanol and ethylene glycol.

10. The composition of claim 9 wherein the molar ratio of said 1,4-cyclohexanedimethanol to ethylene glycol is from 4:1 to about 1:4.

11. The composition of claim 10 wherein said aromatic dicarboxylic acid or its ester forming reactive derivative is selected from a mixture of isophthalic and terephthalic acids.

12. The composition of claim 1 wherein said aromatic polycarbonate resin contains at least the following recurring structural unit

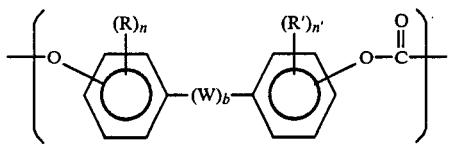

wherein

R is independently selected from monovalent hydrocarbon radicals, monovalent hydrocarbonoxy radicals, and halogen radicals, R' is independently selected from monovalent hydrocarbon radicals, monovalent hydrocarbonoxy radicals, or halogen radicals, W is selected from divalent hydrocarbon radicals, —O—, —S—, —S—S—,

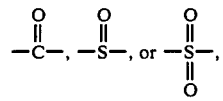

b is either zero or one, and n and n' are independently selected from integers having a value of from 0 to 4 inclusive.

13. The composition of claim 12 wherein b is one.

14. The composition of claim 13 wherein said divalent hydrocarbon radical represented by W is selected from alkylene, alkylidene, cycloalkylene, or cycloalkylidene radicals.

15. The composition of claim 14 wherein W is selected from alkylidene radicals.

16. The composition of claim 15 wherein said alkylidene radical is 2,2-propylidene.

17. The composition of claim 16 wherein n and n' are zero.

18. The composition of claim 1 which contains a flame retardant amount of at least one flame retardant additive.

19. The composition of claim 18 wherein said flame reatardant additive is selected from the alkali or alkaline earth metal salts of organic sulfonic acids.